United States Patent

Riggs

[15] 3,691,517
[45] Sept. 12, 1972

[54] SEISMIC HOLOGRAPHY

[72] Inventor: Emmet D. Riggs, Dallas, Tex. 75208

[73] Assignee: Atlantic Richfield Company, New York, N.Y.

[22] Filed: July 25, 1969

[21] Appl. No.: 844,864

[52] U.S. Cl.............................340/15.5 CP, 340/5 H
[51] Int. Cl................................................G01v 1/00
[58] Field of Search.........340/15.5, 5 H, 5 I, 15.5 CP

[56] References Cited

UNITED STATES PATENTS

| | | |
|---|---|---|
| 3,629,796 | 12/1971 | Brownscombe et al....340/5 H |
| 3,534,326 | 10/1970 | Glenn, Jr..................350/96 B |
| 3,307,145 | 2/1967 | Dunster et al. ...........340/15.5 |
| 3,410,363 | 11/1968 | Schwartz ...................340/5 H |
| 3,461,420 | 8/1969 | Silverman.................340/15.5 |

OTHER PUBLICATIONS

Thurstone, "Holographic Imaging with Ultrasound", Journal of Acoustical Soc. of America, 4–1969, pp. 895–899, Bakhrakh, "Use of Holography in Reconstruction of Polar Diagram of UHF Antennas from Field Meas. in the Fresnel Zone", Soviet Physics– Doklady, Vol. 11, No. 12, 6–1967, pp. 1102–1104

Korpel, "Visualization of the Cross Section of a Sound Beam by Bragg Diffraction of Light", Applied Physics Letters, Dec. 1966, pp. 425–427

*Primary Examiner*—Benjamin A. Borchelt
*Assistant Examiner*—S. C. Buczinski
*Attorney*—Blucher S. Tharp and Robert E. Lee, Jr.

[57] ABSTRACT

By utilization of the principles of holography, a remote object, usually a seismic anomaly, is made visible and subject to detail examination by visual or optical means. Coherent acoustical energy is transmitted into the earth or other elastic medium and the energy received with areal detector means. A reference signal obtained from the energy source is delayed, amplified, and mixed with the signals from the areal detector means to obtain a conventional holographic interference pattern. Scaling is accomplished by an optical reduction. A seismic model is used to provide an ultrasonic test signal equivalent in major respects to seismic field conditions for recording acoustical holograms.

3 Claims, 5 Drawing Figures

INVENTOR
Emmet D. Riggs

BY Robert Elsworth Lee
ATTORNEY

INVENTOR.
Emmet D. Riggs

SEISMIC HOLOGRAPHY

BACKGROUND OF THE INVENTION

The invention pertains to exploration seismology and particularly concerns the application of the principles of holography to seismic prospecting. The same techniques, however, can be extended to the examination of three-dimensional objects of any sort by means of coherent elastic waves in any medium in which they can be propagated.

General teachings of interest concerning holography and its application include the following material which is introduced herein by reference:

Leith and Upatnicks, *Scientific American*, June 1965, in an article entitled "Photography by Laser."

Pennington, *Scientific American*, February 1968, in an article entitled "Advances in Holography."

El-Sum, *Science and Technology*, November 1967, in an article entitled "Uses for Holograms."

Ennos, *Contemporary Physics*, Vol. VIII, No. 2, 1967, in an article entitled "Holography and Its Applications."

Collier, *IEEE Spectrum*, July 1966, in an article entitled "Some Current Views on Holography."

Thurstone, *Proceedings of the IEEE*, April 1968, in an article entitled "On Holographic Imaging with Long Wavelength Fields."

Metherell, El-Sum, Larmore, *Acoustical Holography*, Vol. 1, Plenum Press, New York, 1969, in a series of articles presented at the Proceedings of the First International Symposium on Acoustical Holography held at Huntington Beach, California, December 14 and 15, 1967.

Goodman, *Introduction to Fourier Optics*, McGraw-Hill Book Company, New York, 1968, in Chapter 8, entitled "Wavefront Reconstruction Imaging or Holography."

Holography is, in essence, a wavefront reconstruction process. When a diffusely reflecting object is illuminated, the reflected illumination from each discrete point on its surface forms a system of expanding spherical waves producing a complex irregular wavefront that contains information about the object. When a suitable reference wave is combined with coherent illumination from the object, the resulting recording, i.e. fringe pattern, is called a hologram. This recording has a unique property that when it is subsequently illuminated with a suitable coherent reference wave, the original wavefront is re-created on passage through the hologram to form a wavefront similar in most respects to that from the original object. Since the reference wave produces an interference pattern in which the original wavefront is reconstructed, an observer, viewing the hologram, sees an illusion which is a replica of the original object.

A hologram is thus a recording of an interference pattern between two coherent fields. One is from the illuminated object and the second is the reference wave. The requirement of the recording medium is that it must be capable of resolving the minimum wavelength of the interference produced by the addition of these two fields. In an acoustic system the wavelength of the energy radiated from the illuminated object may vary from the ultrasonic to those experienced in geophysical seismic operations. Since the final hologram must be examined under illumination in visible light range, there is a scaling factor of considerable magnitude involved. Scaling can be done in a number of ways and the amount of scaling is primarily dependent upon the wavelength of the original field used to illuminate the object and serve as the reference wave. If the reference wave used to record the hologram and the coherent wave used in the reconstruction process are both plane wavefronts, the hologram must be scaled by their wavelength ratio in order to reconstruct an image the same size of the original object. In the case of geophysical applications, a reduction by this ratio generally introduces an image reduction which requires optical magnification for satisfactory observation.

At least two patents directed toward seismic holography have already appeared. Reference is made to Silverman, U. S. Pat. No. 3,400,363, patented Sept. 3, 1968, and Silverman, U. S. Pat. No. 3,450,225, patented June 17, 1969. Silverman proposes to transmit continuous sound waves of constant frequency into the earth and detect the returned energy with areal detector means. Silverman's detector means is comprised of a plurality of transducers forming a grid of points over the detector area connected to a plurality of light emitters (glow lamps). Each transducer controls illumination of one of the light emitters according to the intensity of sonic energy received at its position. However, it is first necessary to mix each received signal with a reference signal, i.e. the transmitted sound waves. In the first cited patent, the reference signal is obtained from the sound source. In the second, the reference signal is derived from a summation process based on the received signal. It is stated that by arranging the array of light emitters in the same pattern as the detector transducers, a photographic record can be obtained which is the equivalent of a hologram.

However, there are still many problems that must be solved before seismic holography becomes a practical tool. One point of difficulty is how to solve the problem of specular reflections. Thus, under usual conditions an image of the energy source is obtained rather than an image of the object being illuminated. Another point of difficulty from a practical standpoint is the large number of seismometer stations which must be laid out on the surface of the earth in order to sample a sufficient number of points to record a hologram. Still another problem is that of scaling so that a hologram recorded at acoustical wavelengths can be reconstructed with coherent light. Another problem has been the need for a seismic model whereby acoustical holography can be performed under controlled conditions in the laboratory.

SUMMARY OF THE INVENTION

The present invention offers solutions to the above stated problems and points of difficulty found in seismic holography. Applicant has invented (1) a process for eliminating specular reflections of the energy source, (2) a process for field recording holograms using a reduced number of seismometer stations, (3) a process for scaling acoustical holograms so that they can be reconstructed with light, and (4) a seismic model whereby acoustical holograms can be recorded using ultrasonics.

According to conventional seismic holography procedures, coherent acoustical energy is transmitted into the earth from an energy source on the surface and subsurface reflections thereof are received with areal detector means at a plurality of seismometer stations. The energy source is a continuous wave generator such as an electric shaker, an hydraulic piston or the like, capable of generating sonic waves of controlled frequency. The detector means forms a two-dimensional array over a predetermined area of the earth's surface and is comprised of a large number of seismometer stations (each which may have one or more seismometers), preferably arranged in a regular geometrical fashion.

One aspect of Applicant's invention deals with the problem of eliminating specular reflections of the energy source so that reconstruction will show an image of the subsurface object being inspected. This is done by using a "diffuser transmitter" as the energy source. Instead of transmitting acoustical energy into the earth at a single point (or small area), the diffuser transmitter synchronously transmits energy at a plurality of spaced apart points. When the output of the energy source is diffused in this manner, undesirable specular reflections are eliminated.

Another aspect of the invention relates to a process whereby the number of seismometer stations in the detector means can be minimized. In brief, this is done by determining or calculating what seismic responses would be obtained at locations intermediate (between) the actual seismometer stations. Responses obtained at seismometer stations on either side of the location in question are delayed, selectively weighted, and combined according to a predetermined function in order to predict the response at the location. Obviously, if one can accurately interpolate what the seismic response will be at a given location, it is redundant to locate an actual field seismometer station at the location. (Rules for establishing a maximum spacing between the seismometer stations are discussed in the "Preferred Embodiments.")

Another aspect of the invention which is considered extremely important by Applicant is his analog process for solving the scaling problem. According to the prior art, seismic signals from each of the seismometer stations comprising the detector means are combined with a reference signal to produce corresponding interference signals. An array of light sources is formed such that their geometrical relation is the same as that of the seismometer stations and each seismometer station is represented by one of the light sources. The luminous intensity of each of the light sources is modulated by the appropriate interference signal and a photographic exposure is made to form a hologram.

Applicant's improvement comprises scaling the distance between the light sources relative to the distances between the seismometer stations (actual or interpolated) by a factor equal to the ratio of the wavelength of light to be used for reconstruction to the wavelength of the reference signal. Since reconstruction is with light whereas the reference signal is an acoustical wave, the light sources must be point sources packed in a matrix at very close spacing. Light fibers having a center to center spacing on the order of one micron are suitable sources for this purpose.

The final aspect of the present invention concerns a seismic model for studying acoustical holography in the laboratory. It comprises a test chamber having ultrasonic transducer means and directional microphone means attached near opposite ends thereof. A target anomaly is scaled to ultrasonic proportions and placed on the floor of the chamber. In operation, coherent acoustical energy is transmitted toward the target anomaly and reflections are received by the directional microphones. A reference signal is mixed with each of the received signals and scaling is accomplished as discussed above.

DESCRIPTION OF THE PREFERRED EMBODIMENT(S)

Figures 1, 2:
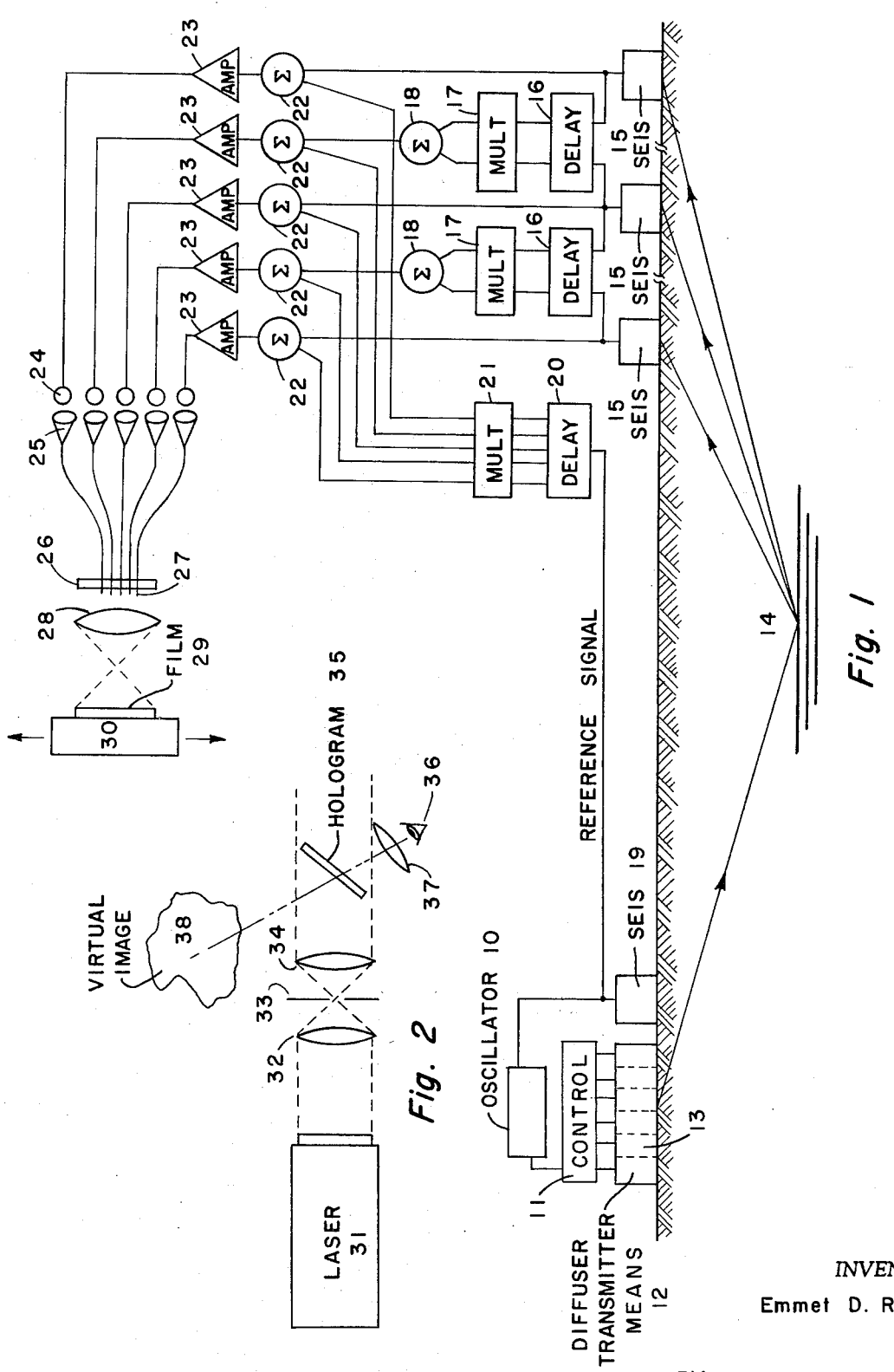
FIG. 1 is a schematic drawing showing Applicant's apparatus for seismic holography illustrating the components required for the recording of a seismic hologram.
FIG. 2 illustrates a method of viewing a hologram obtained from the apparatus shown in FIG. 1.

To gain a better understanding of the invention, refer first to FIG. 1 which shows how seismic holograms are recorded. Oscillator 10 is the frequency controlling portion of the energy generating system. In conventional field operations this frequency controlling source may be a precisely regulated electronic oscillator operating in the seismic band or it may be a prerecorded trace which is being played back. Control means 11 provides necessary phase control or delay among the signals provided to diffuser transmitter means 12. Coherent acoustical signals are transmitted by diffuser transmitter means 12 according to the output signal of oscillator 10. Diffuser transmitter means 12 may be a continuous wave generator such as an electric shaker, an hydraulic piston, or the like, capable of producing a carefully controlled acoustical equivalent of the oscillator signal. This transmitter diffuser means has multi-element units 13 randomly or regularly spaced to cover an areal extent.

One of the requirements of diffuser transmitter means 12 is that it generate an acoustical wave in the earth, having a maximum energy lobe directed in the direction of the anomaly of interest. This requirement can be met by the introduction of an appropriate phase delay entered by control means 11 dependent upon the geometrical location of each element of the diffuser transmitter in operation. The second requirement is that the actual wavefront, consisting of energy from units 13, contain slight phase differences such that the effect of the overall energy pattern is to produce a diffuse type of reflection from the anomaly which is being illuminated.

Diffuse illumination is desirable instead of specular because the resulting visual observation of the final hologram produces an image in which the anomaly of interest can be viewed in a normal fashion and all parts observed from one position of observation. In contrast, if the object being mapped is illuminated by a non-diffuse type of illumination so that specular reflections are obtained, the object can be seen only as a reflection from the source supplying the acoustical energy. Hence, diffuse type of illumination produces a much more usable hologram because the objects appear as the observer expects from experience to see an object viewed optically.

In practice, the weathered layer normally associated with the near surface of the earth has been found to be useful in producing a diffuse type of reflection. The weathering of the near surface from the action of water, wind, and temperature variations produce uneven acoustical conditions near the surface. If the appropriate phase delay is introduced to form the output of units 13 of diffuser transmitter means 12 into a directed beam with the main energy lobe oriented towards the surface of the anomaly of interest, then the slight delay imposed by the variations of near surface weathering serves to produce a semi-diffuse energy source having an average plane wavefront. By using a sufficient number of units 13, a totally diffuse energy output can be obtained and specular reflections completely eliminated.

Referring further to FIG. 1, the reflected energy from subsurface formation 14 is detected by seismometer stations 15 and the resulting seismic signals are modified in a manner indicated subsequently. Each seismometer station 15 may consist of one or a plurality of seismometers connected to a common output. As will be seen in conjunction with FIG. 2, seismometer stations 15 in reality form an areal detector means covering a preselected area or region of the earth. It is understood, however, that only one seismometer station is actually needed since it can be moved from location to location while diffuser transmitter means 12 transmits repeated signals so that the final result is areal coverage.

In FIG. 1, three seismometer stations 15 have been shown; however, it will be seen that there are five seismic output channels. What Applicant has done is to use delay units 16, multiplier means 17, and summation means 18 to interpolate seismic signals intermediate to the signals recorded at actual field seismometer stations. Delay units 16 provide a delay for the received seismic signals so that they are properly time aligned for normal moveout. Multiplier means 17 then weights the seismic signals relative to each other according to a predetermined function (usually linear based on surface distance). Summation means 18 combines or adds input signals from multiplier means 17 in order to determine the seismic signal at a preselected point intermediate to the signals being operated upon. If desired, several seismic signals may be interpolated in this manner between adjacent pairs of seismometer stations 15.

Oscillator 10, in addition to exercising frequency control over the various elements of diffuser transmitter means 12, also provides a reference signal which is fed to delay unit 20. Alternatively, the requisite reference signal is obtained by means of seismometer station 19 located adjacent to diffuser transmitter means 12. In either event, the reference signal is appropriately delayed by delay unit 20 and then weighted or amplified by multiplier means 21 to a predetermined level.

Delay unit 20 provides a delay for the reference signal so that the effect produced at summation means 22 is that of a uniform plane wavefront of the reference signal arriving at a predetermined optimum angle from the opposite direction to that of the emerging wavefront of the seismic signal. This is a conceptual device to avoid confusion with the idea of the reference wave traveling through the weathered near surface. In reality, the reference wave is added in such a manner that there is a phase shift between the average value of the emerging seismic wave equivalent to a reference angle (usually 30°) between the two wavefronts. Multiplier means 21 serves to change the signal or the impedance level of the output of delay unit 20 and has uniform phase delay so that the individual channels from delay 20 are altered on a fixed and controlled manner necessary to adjust their level for proper functioning relative to the seismic signals so that maximum interference signals can be formed. The reference signal is then separately mixed with each of the seismic signals by summation means 22 in order to form corresponding interference signals.

Amplifier means 23 are used to convert the summation signals from summation means 22 to voltages with impedance levels necessary to drive light sources 24. Since this is a steady state system, incandescent type lamps may be used for light sources 24 since the phase delay involved in any modulation scheme is not a factor. One type of lamp which has been used is Chicago Miniature Lamp Works, Type T1/2 No. CMA—752 requiring 2 volts at 120 ma for normal illumination. This lamp has an overall maximum diameter of 74/1000 of an inch. Another lamp suitable for this operation is manufactured by Los Angeles Miniature Products and is their lamp No. 3 having a maximum diameter of 93/100 inch operating at 1.5 volts and 15 ma for normal illumination.

Optically connected to the lamp means 24 are optical transformer sections 25 which serve to couple lamps 24 to optical fibers 27. Technically, each optical section 25 is approximately 1 inch long and has a maximum diameter sufficient to match or couple into one of the lamps 24. It is approximately one-tenth inch in diameter at the lamp end and about 25/1000 inch at the optical fiber end. The lamp end is formed into a spherical shape to partially fit over the end of the lamp to provide maximum coupling optimum of the light output and the optical fiber end is drilled so that the optical fiber can be inserted and cemented in place. The other ends of the light fibers are arranged in an opaque holder (not shown) so that the individual lamps may be examined or replaced if necessary. Likewise, for ease of handling, the individual transformer sections are inserted into a plate or holder (not shown) such that the output optical fibers project through the opposite side. The transformer mounting plate and the lamp mounting plate are keyed so that when they are placed together and fastened, the individual units are aligned in proper sequence.

The use of light fibers for the conduction of light is, of course, well known. Smooth fibers of transparent material such as glass conducts light with high efficiency because of total internal reflection along the walls with the result that individual fibers in a cluster or bundle conduct light independently of one another. In practice, there are present a number of minute defects and contaminations at the interface which interfere with the total reflection by absorption scattering. With a light fiber these losses become serious because there may literally be hundreds or thousands of these minute imperfections as the light passes along the fiber. Thus, an uncoated glass fiber is, in practice, a very poor means of transmitting light. In addition, an uncoated fiber in contact with another uncoated fiber permits some leakage of light across the interface. Both of these short-comings are largely overcome, however, by coating the fiber with glass or other material having a different index refraction from that of the fiber. In this particular case, we are not interested in the highest efficiency of transmission along the fiber since only a short piece of fiber is used but rather we are concerned with the ability to reduce the fiber to a very small termination and to reduce the cross feed or leakage into adjacent channels. In practice, this particular application has used a fiber with a core having an index refraction of 1.62 and coated with a glass having a 1.52 index. Such fibers are available from the American Optical Company and can be obtained in a number of sizes. The 75 to 100 micron diameter fibers are convenient to manipulate and are useful in this particular fabrication. They are easy to manipulate and can be heated and stretched until their diameters are sufficiently reduced.

The face plate 26 serves as a termination for optical fibers 14 and is fabricated on a special fixture having provisions for microscopic manipulation of the fiber and optical observation at each stage of the observation. In practice, each fiber 27 is cemented into transformer section 25 by use of an optical cement such as Canadian Balsam or preferably a synthetic material used to cement elements of lenses together and the assembly is mounted in the fixture previously referred to. The end portion of optical fiber 27 is heated under control conditions, stretched until its cross section diameter is 1 to 1 ½ microns in dimension, placed in its appropriate position in face plate 26 and cemented into position. After the complete operation of mounting the entire group of fibers, the fixture is removed and face plate 26 is optically finished by methods well known in optical technology.

Face plate 26 serves as an object for photographic lens 28 which forms an image on photographic means 29. This photographic means is normally an Eastman Kodak S.O. 649F photographic plate. This plate is secured into position on a transport means 30 so that as the detector means indicated as seismometer stations 19 is moved, transport means 30 is adjusted to a new position so that the image formed by lens 28 falls upon the appropriate position on photographic means 29.

Photographic film used in the linear range of its exposure logistic curve is a square log detector and because of this squaring process it stores neither phase nor amplitude but instead a time averaged intensity distribution of the light striking the film. In the hologram, the drops and irregular interference patterns observed under a microscope on a developed plate represent an interference pattern between the reference wave and the light emitted by the object being recorded. Since we are concerned with the photographic resolution obtainable in a hologram and visible to the observer by optical means, the resolution capabilities of the various components of this system are critical.

After the recording of the data is accomplished on photographic means 29, the plate is processed using conventional photographic techniques and preferably followed by some well-known bleaching process to increase its efficiency as a hologram. The resulting hologram is then viewed as indicated in FIG. 2. In this conventional method of viewing a hologram, laser 31 provides a coherent output in the visible range. This output is focused to a point by lens 32, normally a very short focal length microscope objective. The output of the lens 32 is focused onto a pinhole or aperture of the aperture plate 33. This aperture is made on the order of 10 to 20 microns in diameter for optimum light transmission while still obtaining maximum rejection of spurious modes from laser 31. Lens 34 is used to reform the beam into a source of coherent light of a size convenient to illuminate the hologram 35 for viewing. This lens normally is a long focal length lens on the order of 20 to 40 cm focal length. Optical means 37 is normally required to enlarge the image observed in hologram 35 for visual observation by observer 36. If laser means 31 is a helium neon laser, the light available to observe the hologram 35 is illuminated with 6,328 angstrom wavelength light. The fringe pattern generated will have a repetition rate of 790 line pairs/mm. Since Eastman Kodak plates, special order 649F, have a resolution in excess of 2,000 line pairs/mm, the limiting factor is the resolution capability of the lens used. There are a number of commercially available lenses which meet this criterion, one of which is a 30 mm F12 ultra micro lens from Ehrenreich Photo Optical Industries, Inc., Gordon City, N.Y. This lens will resolve in excess of 1,200 lines/mm.

Applicant has discovered that the optically most efficient hologram is obtained if the exposure of the photographic means 17 of FIG. 1 is carried beyond the linear range of the log exposure density curve of the photographic emulsion being used if one of several processes are used to convert a density hologram into a phase hologram based on the effects obtained by variation in the index of refraction between various portions of the recorded image pattern. This increased efficiency is based upon the fact that in a bleached hologram the modification of the reference beam by the hologram is the result of variations in index refraction instead of variations in the density of the developed emulsion.

The apparatus illustrated in FIG. 2 indicates a viewing of hologram 35 after the holographic recording has been accomplished. The hologram 35 can be observed in real time if part of the apparatus of FIG. 2 is combined with the proper photographic recording means 17 of FIG. 1 so that the visual image recorded on photographic means 17 is observed without subsequent chemical development required for conventional photographic plates or film.

Figure 3:
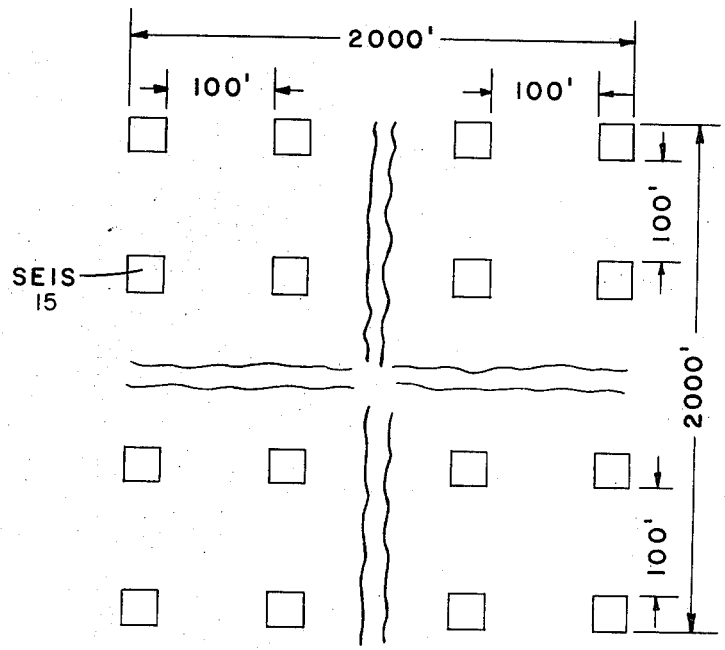
FIG. 3 is an illustration of the arrangement of detector means on the ground for the recording of an acoustical hologram by seismic means.

Referring to FIG. 3, typical detector means is illustrated comprised of seismometer stations 15 on 100-foot spacings and having a total areal coverage of 2,000 × 2,000 feet. The seismometer spacing of 100 feet is indicated in FIG. 3 as a typical value necessary for field operations. Since the smallest wavelength that we may deal with in field practice may be of the order of 500 feet, this value indicates five sampling points per wavelength. In the typical values of a wavelength of 200 feet along a ray path, it has been found that the surface sampling interval of one-half wavelength provides reasonable quality of recovered waveform. For reasons already discussed, it is considered a good practice, but not always completely essential, to interpolate between the individual sampling points provided by adjacent seismometer stations 15. This interpolation means is provided in FIG. 1 by delay units 16 and multiplier means 17 along with summation means 18. Although only one of these summation means that is associated to delay and multiplier means is indicated between the individual seismometer channels, this does not restrict the invention to one interpolation. The only requirement is that the phase delay between the signal derived from adjacent channels be proportionately spaced so that the final recovered signal of interpolation points have some known functional relationship to the adjacent seismometer date points. This relationship has been found to be normally linear.

It is assumed that the frequency of oscillator 10 is maintained precisely at 40 cycles and the seismic velocity of the near surface immediately under the weather layer is 8,000 feet per second, the wavelength of an emerging signal is of the order of 200 feet measured along a ray path. However, since this wave strikes the interface between the surface of the earth and the atmosphere above at which or near which the detector means composed of a multiplicity of seismometer stations 15 is located, the effected wavelength changes. In the case of a shallow emerging wave, the effected wave along the surface is about 2,000 feet and the effected wave for an emerging ray from depth is about 500 feet. This can be more easily understood if it is assumed that there is a steady state wavefront composed of many components being reflected from the anomalous subsurface structure. These steady state waves are arriving at the surface and are being detected by the matrix or grid of seismometers indicated as 15. The reference signal may be assumed to be added to the waves arriving from the subsurface. In ordinary seismic prospecting, the angle of incidence for the emerging wave (angle from the vertical) can be assumed to be of the order of 5° to 20°. To this emerging wave we must add a reference wave which can be assumed to approach the surface from the opposite direction. In practice it has been found that this angle, which is the sum of the angle of incidence of the emerging wave plus the angle of incidence of the reference wave, should be on the order of 30° to produce the maximum usable resolution of small detail from the subsurface anomaly yet provide reasonable resolution requirements for the optical components to follow in the equipment.

Figure 4:
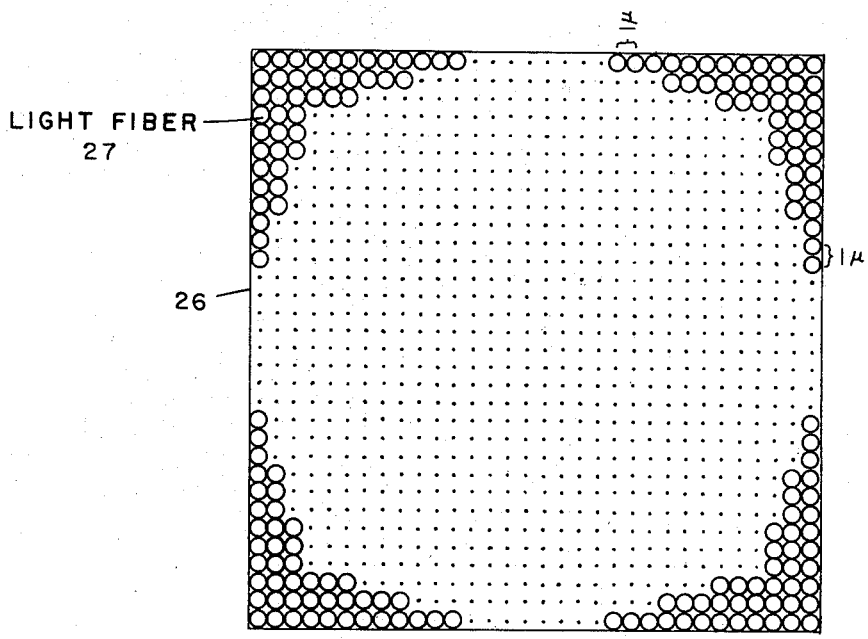
FIG. 4 shows the arrangement of the output ends of the optical fibers arranged in a matrix forming the scaler.

Referring to FIG. 4, termination plate 26 is shown having a matrix of light fibers 27. In FIG. 3 the detector means has 20 seismometer stations in each direction for a total of 400. Therefore, at a minimum, termination plate 26 would contain 400 fibers. However, by means of Applicant's interpolation technique, it is readily possible and desirable to determinate three interpolation points between each adjacent pair of seismic signals. By way of illustration, termination plate 26 would then have a matrix dimension of 77 × 77 fibers for a total of 5,929. The physical dimensions of termination plate are about 20 × 20 inches and the light fibers are spaced approximately one micron apart (center to center).

Figure 5:
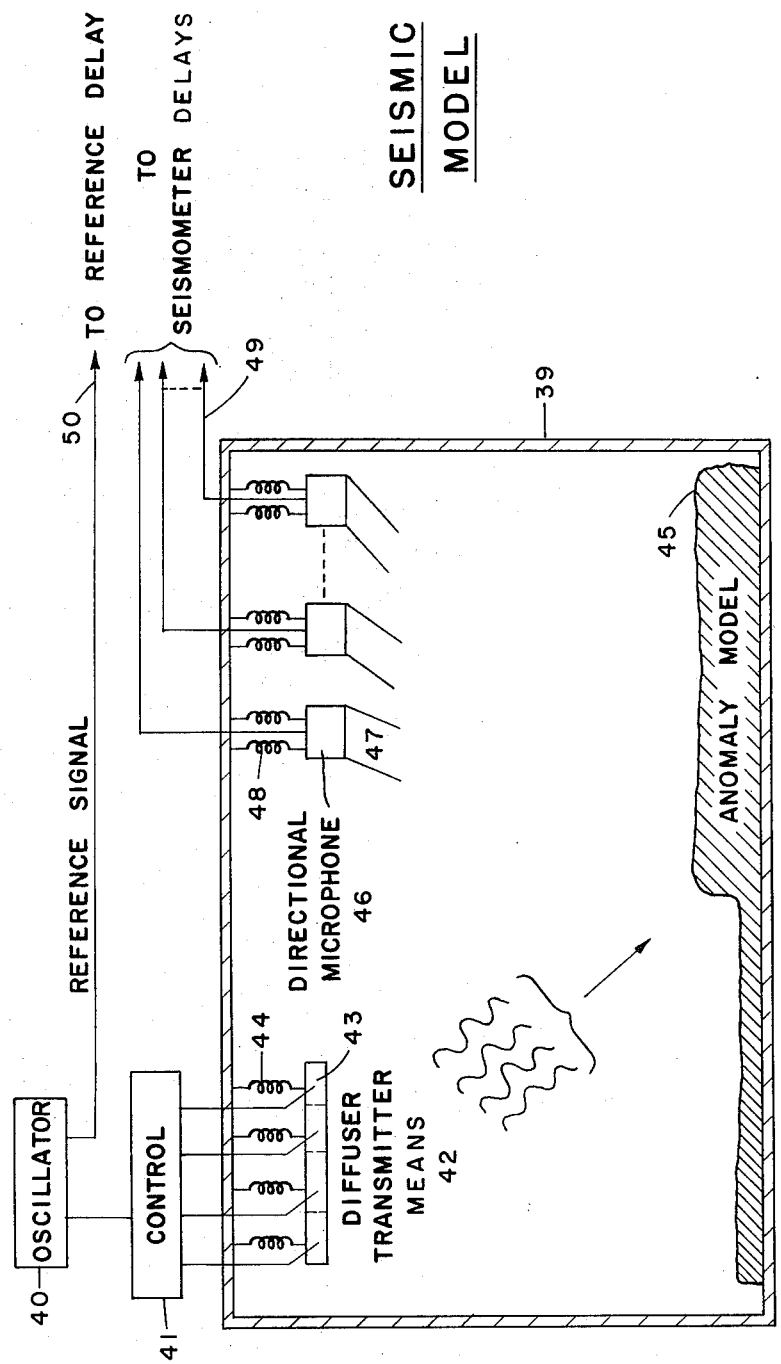
FIG. 5 is an illustration of the ultrasonic signal generator and seismic model for recording acoustical holograms.

Another unique feature of this invention is the apparatus whereby the realistic test signal can be generated for purposes of alignment or to reduce holographic images from an anomalous model. Referring to FIG. 5, the seismic model is contained within test chamber 39. Oscillator 40 is the means of frequency control of the energy which is transmitted from the diffuser transmitter means 42. Control 41 serves as a delay means whereby the various elements 43 of the diffuser transmitter are shifted in phase so that the average phase of the energy is directed towards anomaly of interest 45 as indicated by the wavefront. Transducers 43 which compose diffuser transmitter means 42 may consist of electromechanical transducers of the piezoelectric type suitable for operating at the desired frequency. They may be barrium titanate, quartz, ADP, tourmaline, or other suitable materials. The entire transmitter assembly is separated from its supports by low-pass mechanical filter sections 44. The sonic energy generated by diffuser transmitter means 42 is reflected off of anomaly model 45 toward exponential horns 47 of directional microphones 48. Each microphone 46 is isolated from the other microphones and suspended from its support by low-pass mechanical filter section 48.

Frequency of operation of this test system depends upon the dimensions. If the velocity of sound and air is approximately 1,100 feet/second and a wavelength of one-half inch is convenient, then the system should operate near 13 khz. The directivity indicated by both diffuser transmitter means 42 and receiving microphones 46 reduces both the direct feed from transmitter elements 43 and spurious reflections from the walls, ceilings, and other reflecting surfaces in the immediate vicinity of the model. The requisite reference signal is obtained from oscillator 40 and is introduced into the delay means 20 of FIG. 1. In a similar manner, the outputs of microphone detectors 46 are introduced into delay means 16 of FIG. 1. This acoustical model is capable of producing holograms as a means of alignment and adjustment of the apparatus shown in FIG. 1 with a signal which is free of the usual spurious noise encountered in field operations. In a similar manner, it is also useful to produce holograms from scaled anomalous models.

What is claimed is:

1. A process for seismic holography comprising
   a. transmitting a coherent seismic signal into the earth,
   b. receiving reflections at a plurality of detector stations positioned over a wide surface area,
   c. combining the reflected signals with a reference signal to produce corresponding interference signals,
   d. providing an array of light sources so that a light source can be modulated by each of said interference signals,
   e. reducing the outputs of said light sources to point sources by means of capillary light fibers having a predetermined diameter at their terminal end, f. arranging the terminal ends of said light fibers in a matrix so that their center to center spacing is in accordance with the ratio of the wavelength of light which is to be used for reconstruction to the wavelength of said reference signal, g. connecting said light fibers to said light sources so that their terminal ends will be in the same geometrical relationship in respect to said interference signals as said detector stations, and h. modulating said light sources with said interference signals, and i. recording a hologram based on the outputs of said light fibers.

2. Apparatus for seismic holography comprising
a. seismic signal transmitter means,
b. areal seismic signal receiving means comprising a plurality of horizontally spaced detectors,
c. reference signal means,
d. summation means for combining the detected seismic signals with the reference signal,
e. a plurality of light sources arranged in the same geometrical order as said detectors, each of said detectors being associated with one of said light sources,
f. a fiber optical system connected to the outputs of said light sources comprised of individual light fibers having their terminal ends critically spaced from one another according to the ratio of the wavelength of light to be used for reconstruction to the wavelength of said reference signal, and
g. photographic means for recording the outputs of said light sources to produce a hologram.

3. Apparatus according to claim 2 where the terminal ends of adjacent light fibers have center to center spacings on the order of one micron.

* * * * *